(12) United States Patent
Barsheshet

(10) Patent No.: US 7,061,859 B2
(45) Date of Patent: Jun. 13, 2006

(54) FAST PROTECTION IN RING TOPOLOGIES

(75) Inventor: Yossi Barsheshet, Givatayim (IL)

(73) Assignee: Corrigent Systems Ltd., Tel Aviv (IL)

( * ) Notice: Subject to any disclaimer, the term of this patent is extended or adjusted under 35 U.S.C. 154(b) by 766 days.

(21) Appl. No.: 09/941,723

(22) Filed: Aug. 30, 2001

(65) Prior Publication Data

US 2003/0043738 A1    Mar. 6, 2003

(51) Int. Cl.
    *H04L 12/26*    (2006.01)
(52) U.S. Cl. ...................... 370/225; 370/529
(58) Field of Classification Search ............... 370/217, 370/221, 222, 223, 216, 218, 224, 241, 250, 370/408, 424, 527, 528, 529, 225, 227, 228
See application file for complete search history.

(56) References Cited

U.S. PATENT DOCUMENTS

| | | |
|---|---|---|
| 4,527,270 A | 7/1985 | Sweeton |
| 5,159,595 A | 10/1992 | Flanagan et al. |
| 5,218,604 A | 6/1993 | Sosnosky |
| 5,283,782 A | 2/1994 | Takase et al. |
| 5,307,353 A | 4/1994 | Yamashita et al. |
| 5,321,393 A | 6/1994 | Carlton et al. |
| 5,327,427 A | 7/1994 | Sandesara |
| 5,436,886 A | 7/1995 | McGill |
| 5,596,569 A | 1/1997 | Madonna et al. |
| 5,638,358 A | 6/1997 | Hagi |
| 5,663,949 A | 9/1997 | Ishibashi et al. |
| 5,796,717 A | 8/1998 | Shinbashi et al. |
| 5,925,137 A | 7/1999 | Okanoue et al. |
| 5,933,258 A | 8/1999 | Flanagan et al. |
| 6,075,767 A | 6/2000 | Sakamoto et al. |
| 6,091,705 A | 7/2000 | Regula |
| 6,212,161 B1 | 4/2001 | Regula |
| 6,226,111 B1 | 5/2001 | Chang et al. |
| 6,233,073 B1 * | 5/2001 | Bowers et al. ............... 398/16 |
| 6,246,667 B1 | 6/2001 | Ballintine et al. |
| 6,256,292 B1 | 7/2001 | Ellis et al. |
| 6,314,102 B1 | 11/2001 | Czerwiec et al. |
| 6,351,452 B1 | 2/2002 | Koenig et al. |
| 6,359,858 B1 | 3/2002 | Smith et al. |
| 6,366,556 B1 * | 4/2002 | Ballintine et al. ......... 370/216 |
| 6,400,682 B1 | 6/2002 | Regula |
| 6,438,144 B1 | 8/2002 | Guzikevitz et al. |

(Continued)

FOREIGN PATENT DOCUMENTS

EP    1 006 702    6/2000

(Continued)

OTHER PUBLICATIONS

Harrera et al, "A Framework for IP over Packet Transport Rings", Iinternet Draft, draft-ietf-ipoptr-framework-00, Jun. 2001.

(Continued)

*Primary Examiner*—Kwang Bin Yao
(74) *Attorney, Agent, or Firm*—Nixon & Vanderhye P.C.

(57) ABSTRACT

In a bidirectional ring network, in which nodes are mutually connected by network segments, a method of fault protection includes constructing a general mask indicating which of the segments can be reached. For a given data flow to be conveyed through the network from a source node to a destination node, a specific mask is constructed indicating the segments on a desired path of the flow. The general and specific masks are superimposed in order to determine a disposition of the flow.

12 Claims, 3 Drawing Sheets

U.S. PATENT DOCUMENTS

| | | | |
|---|---|---|---|
| 6,442,134 B1 | 8/2002 | Mitchell | |
| 6,456,407 B1 | 9/2002 | Tammela et al. | |
| 6,456,587 B1 * | 9/2002 | Taniguchi | 370/216 |
| 6,466,576 B1 | 10/2002 | Sekine et al. | |
| 6,597,689 B1 | 7/2003 | Chiu et al. | |
| 6,636,478 B1 | 10/2003 | Sensel et al. | |
| 6,680,904 B1 | 1/2004 | Kaplan et al. | |
| 6,680,906 B1 | 1/2004 | Nguyen | |
| 6,680,912 B1 | 1/2004 | Kalman et al. | |
| 6,687,231 B1 | 2/2004 | Czerwiec et al. | |
| 6,707,823 B1 | 3/2004 | Miyao | |
| 6,711,125 B1 | 3/2004 | Walrand et al. | |
| 6,724,880 B1 | 4/2004 | Lynch | |
| 6,731,597 B1 | 5/2004 | Batchellor et al. | |
| 6,748,175 B1 | 6/2004 | Adams et al. | |
| 6,795,394 B1 | 9/2004 | Swinkels et al. | |
| 6,820,210 B1 | 11/2004 | Daruwalla et al. | |
| 6,826,158 B1 | 11/2004 | Seaman et al. | |
| 6,839,514 B1 | 1/2005 | Sharma et al. | |
| 6,865,149 B1 | 3/2005 | Kalman et al. | |
| 6,879,559 B1 | 4/2005 | Blackmon et al. | |
| 2001/0026384 A1 | 10/2001 | Sakano et al. | |
| 2002/0003639 A1 | 1/2002 | Arecco et al. | |
| 2002/0018481 A1 | 2/2002 | Mor et al. | |
| 2002/0048066 A1 | 4/2002 | Antoniades et al. | |
| 2002/0176371 A1 | 11/2002 | Behzadi | |
| 2002/0179720 A1 | 12/2002 | Liva et al. | |
| 2002/0186667 A1 | 12/2002 | Mor et al. | |
| 2003/0031126 A1 | 2/2003 | Mayweather et al. | |
| 2003/0196135 A1 | 10/2003 | Gottlieb | |

FOREIGN PATENT DOCUMENTS

| | | |
|---|---|---|
| WO | WO 99/04596 | 1/1999 |

OTHER PUBLICATIONS

Tsiang et al, Request for Comments (RFC) 2892 of the Internet Engineering Task Force (IETF), Aug. 2000.

UETF RFC 3031, "Multiprotocol Label Switching Architecture", Jan. 2001 (Available at www.ietf.org/rfc.html).

"Inverse Multiplexing for ATM (IMA) Specification Version 1.1", ATM Forum. 'Online! Mar. 1999.

Papa Del J, et al, "DSLAM—A Broadband Digital Subscriber Line Access Multiplexer System", NEC Research and Development, Nippon Electric Ltd. Tokyo, Japan, vol. 40, No. 1, Jan. 1999, pp. 103-107.

UETF RFC 3031, "Multiprotocol Label Switching Architecture", Jan. 2001 (Available at www.ietf.org/rfc.html)

Office Action from U.S. Appl. No. 09/876,414, dated Dec. 30, 2004.

Office Action dated Jun. 27, 2005 from U.S. Appl. No. 10/211,065.

* cited by examiner

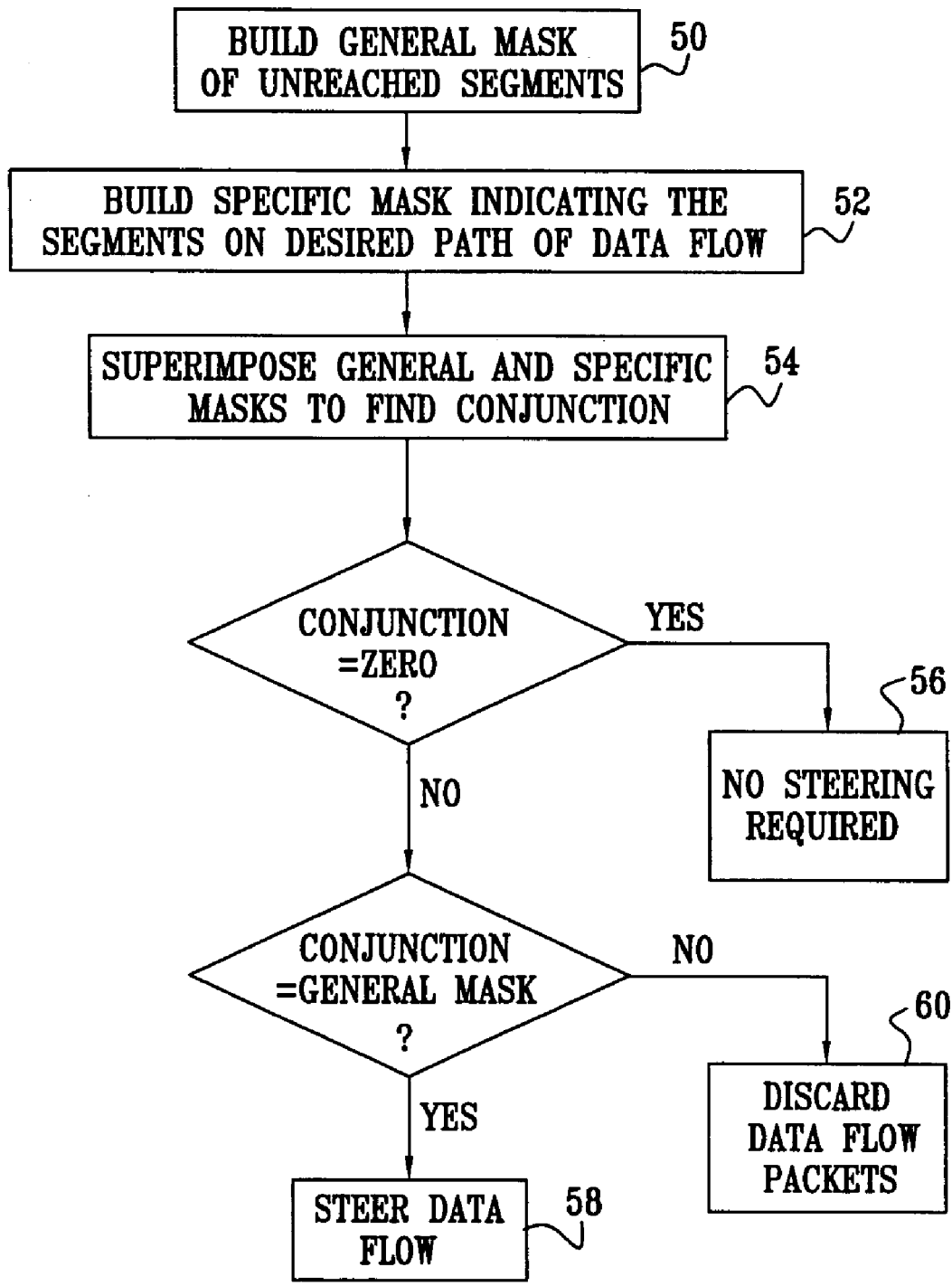

FAST PROTECTION IN RING TOPOLOGIES

FIELD OF THE INVENTION

The present invention relates generally to communication networks, and specifically to high-speed packet rings.

BACKGROUND OF THE INVENTION

Network ring topologies are gaining in popularity, particularly in Internet Protocol (IP) networks. Such networks enable carriers to offer large bandwidth to users in a cost-effective manner. They also lend themselves to fast rerouting in the event of network failures, since two alternative routes in clockwise and counterclockwise directions—are generally available for connecting any two nodes on the ring. A drawback of traditional ring implementations, such as SONET/SDH, is that one of the directions is designated as the active ring, while the other direction remains on standby for fault protection when needed. In other words, at any given time, all of the nodes in the ring transmit and receive data only in the active direction. Therefore, ordinarily half of the available bandwidth in these rings is reserved for fault protection and is not exploited under normal operating conditions.

Some recently-developed bidirectional protocols provide more efficient bandwidth utilization by enabling data to be transferred between any pair of nodes in either direction around the ring. The two opposing traffic directions are commonly referred to as an inner ring and an outer ring. It will be understood, however, that in the context of the present patent application and in the claims, the terms "inner" and "outer," as well as "clockwise" and "counter-clockwise," are used arbitrarily to distinguish between the two opposing directions of packet flow in a ring network. These terms are chosen solely for convenience of explanation, and do not necessarily bear any relation to the physical characteristics of the network.

The leading bidirectional protocol for high-speed packet rings is the Resilient Packet Rings (RPR) protocol, which is in the process of being defined as IEEE standard 802.17. Network-layer routing over RPR is described, for example, by Jogalekar et al., in "IP over Resilient Packet Rings" (Internet Draft draft-jogalekar-iporpr-00), and by Herrera et al., in "A Framework for IP over Packet Transport Rings" (Internet Draft draft-ietf-ipoptr-framework-00). A proposed solution for Media Access Control (MAC—protocol layer 2) in bidirectional ring networks is the Spatial Reuse Protocol (SRP), which is described by Tsiang et al., in Request for Comments (RFC) 2892 of the Internet Engineering Task Force (IETF). These documents are incorporated herein by reference. They are available at www.ietf.org. Using protocols such as these, each node in a ring network can communicate directly with all other nodes through either the inner or the outer ring, using the appropriate Media Access Control (MAC) addresses of the nodes.

When a node detects a fault in a ring network (typically due to failure of a segment or of one of the other nodes in the network), it sends a failure alarm around the network to the other nodes. Based on the alarm location, each of the nodes must decide how to handle data flows that it is transmitting. Various protection mechanisms are known in the art for dealing with such failures, such as wrapping traffic from one of the rings onto the other in order to avoid the failed node or segment, and steering traffic at each node away from the failed node or segment. It is generally required that the protection mechanism take no more than 50 ms to start operating following occurrence of the fault, in line with the standard performance of SONET/SDH rings. Therefore, each of the nodes must be capable of deciding rapidly whether or not it is necessary to divert its current data flows from their previously-determined paths. In order to conserve bandwidth, it may even be desirable to stop a given flow entirely if the destination node has become unreachable due to the fault.

SUMMARY OF THE INVENTION

It is an object of some aspects of the present invention to provide improved methods and devices for determining paths over which data flows are to be conveyed in a ring network.

It is a further object of some aspects of the present invention to provide an improved mechanism for rapid fault protection in a ring network.

In preferred embodiments of the present invention, each of the nodes in a ring network responds to a fault by constructing a general mask, which indicates the segment or segments of the network that have become unreachable as a result of the fault. Preferably, the mask has the form of a bitmap, with a bit for each segment, in which the bits corresponding to the unreachable segments are set. In addition, for each data flow that it must transmit, the node constructs a specific mask, preferably in bitmap form similar to the general mask, indicating the segments over which the flow was to be conveyed to the destination node before the fault occurred.

To determine the disposition of the data flow, the node mathematically superimposes the general and specific masks, preferably by means of a Boolean conjunction operation. When the result is null (no overlap between general and specific masks), the node can simply transmit the flow without change. When the result corresponds exactly to the general mask (showing that the unreachable segments are all contained within the intended path), the node steers the flow in the opposite direction, away from the failed segments. In any other case (only partial overlap of the unreachable segments with the desired path), the node concludes that the destination node has been isolated by the fault, and is no longer reachable in either ring direction. The data flow is therefore delayed or discarded entirely. In any case, the node is able to decide rapidly, with minimal computational cost, on the course of action that makes optimal use of the network resources remaining after the fault.

There is therefore provided, in accordance with a preferred embodiment of the present invention, in a bidirectional ring network, in which nodes are mutually connected by network segments, a method of fault protection, including:

constructing a general mask indicating which of the segments can be reached;

for a given data flow to be conveyed through the network from a source node to a destination node, constructing a specific mask indicating the segments on a desired path of the flow; and superimposing the general and specific masks in order to determine a disposition of the flow.

Preferably, constructing the general mask includes assigning a respective general mask bit to each of the segments, indicating whether the segment can be reached following occurrence of the fault. Most preferably, constructing the specific mask includes assigning a respective specific mask bit to each of the segments, indicating whether the flow was to be conveyed over the segment had the fault not occurred.

Preferably, superimposing the masks includes combining the masks by means of a Boolean operation.

In a preferred embodiment, superimposing the masks includes determining whether to convey the data flow over the desired path, to steer the data flow over an alternative path, or to stop conveying the data flow. Preferably, superimposing the masks includes generating a combined mask, and determining that the data flow should be conveyed over the desired path when the combined mask is null, that the data flow should be steered over the alternative path when the combined mask corresponds to the general mask, and that the data flow should not be conveyed when the combined mask is neither null, nor does it correspond to the general mask.

There is also provided, in accordance with a preferred embodiment of the present invention, a communication device for use in a bidirectional ring network, in which nodes are mutually connected by network segments, the device including a network processor, which is adapted to construct a general mask indicating which of the segments can be reached in the event of a fault in the network, and to construct a specific mask for a given data flow to be conveyed through the network from a source node to a destination node, the specific mask indicating the segments on a desired path of the flow, and to superimpose the general and specific masks in order to determine a disposition of the flow.

The present invention will be more fully understood from the following detailed description of the preferred embodiments thereof, taken together with the drawings in which:

BRIEF DESCRIPTION OF THE DRAWINGS

FIG. 4 is a flow chart that schematically illustrates a method of fault protection in a ring network, in accordance with a preferred embodiment of the present invention.

DETAILED DESCRIPTION OF PREFERRED EMBODIMENTS

Figure 1:
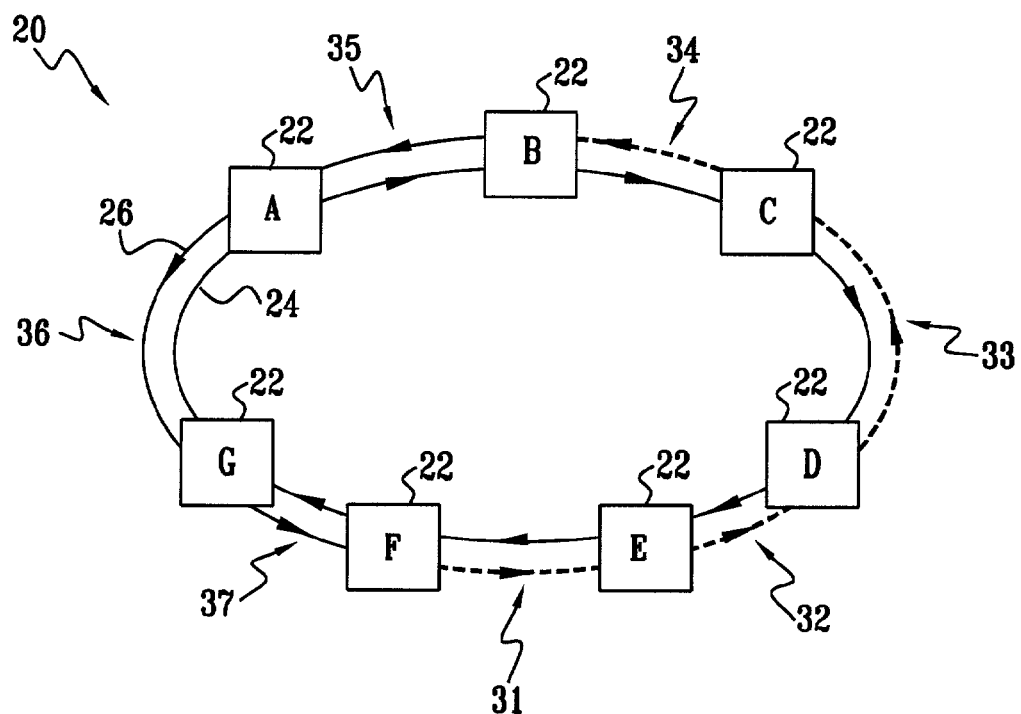
FIG. 1 is a block diagram that schematically illustrates a ring network, in accordance with a preferred embodiment of the present invention.

FIG. 1 is a block diagram that schematically illustrates a bidirectional ring network 20, in accordance with a preferred embodiment of the present invention. Network 20 comprises a plurality of nodes 22, labeled A through C, which are mutually connected by network segments 31, 32, 33, 34, 35, 36 and 37. The nodes typically comprise switching equipment, and may serve as either gateways to other networks (aggregation points) or access points. The network segments comprise a bidirectional communication medium, such as optical fibers or conductive wires. The communication medium is configured to define an inner ring 24, over which packets are conveyed between the nodes in a clockwise direction, and an outer ring 26, over which the packets are conveyed in a counterclockwise direction.

The sequence of dashed arrows in the figure shows the path of an exemplary data flow on ring 26 from source node F to destination node B via segments 31, 32, 33 and 34. In one preferred embodiment of the present invention, the flow corresponds to a Multiprotocol Label Switching (MPLS) tunnel provided between nodes F and B, in accordance with IETF RFC 3031, entitled "Multiprotocol Label Switching Architecture" (January, 2001), which is incorporated herein by reference. Alternatively, the flow may be created using any other suitable communication protocol known in the art.

Figure 2:
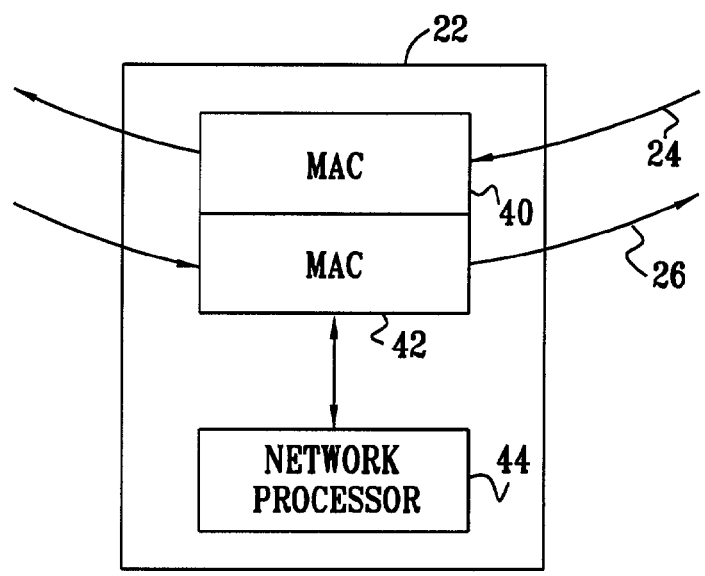
FIG. 2 is a block diagram that schematically shows a detail of a node in the network of FIG. 1.

FIG. 2 is a block diagram that schematically shows details of one of nodes 22, in accordance with a preferred embodiment of the present invention. Typically, the node comprises a pair of MAC blocks 40 and 42, with block 40 serving inner ring 24, and block 42 serving outer ring 26. MAC blocks 40 and 42 are coupled to and controlled by a network processor 44. The network processor preferably comprises a chip or chip set that is able to access and process higher-layer protocol information. It performs network-layer functions, such as IP processing and routing of data flows, as well as delivery of packets to users (in the case of access nodes) or to another network (in the case of gateway nodes). Optionally, the network processor handles other, higher-level functions, as well, such as Quality of Service (QoS) and network security. In addition (and most centrally from the point of view of the present invention), processor 44 is responsible for fault protection, as described in detail hereinbelow.

Figure 3:
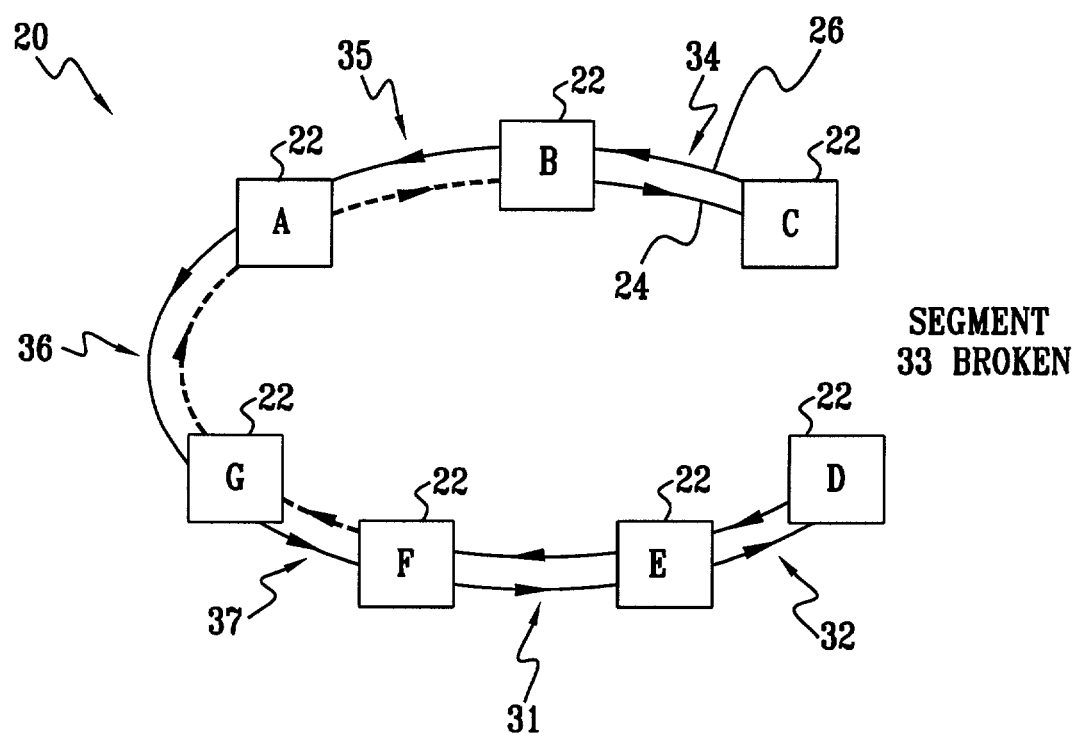
FIG. 3 is a block diagram that schematically illustrates steering of packets in the network of FIG. 1 following occurrence of a fault, in accordance with a preferred embodiment of the present invention.

FIG. 3 is a block diagram showing an alternative route taken by the data flow from node F to node B, in accordance with a preferred embodiment of the present invention, following occurrence of a fault in segment 33. Node F has received an alarm indicating that segment 33 is not reachable and has determined accordingly, using the method described below, that the flow to node B that previously passed through this segment (as shown in FIG. 1) must be redirected. Accordingly node F steers the data flow to node B over ring 24 through segments 37, 36 and 35. In the case of MPLS, mentioned above, steering is carried out by directing the flow through a different tunnel, running in the clockwise direction, rather than counterclockwise, as before the fault occurred.

FIG. 4 is a flow chart that schematically illustrates a method of fault protection that is used by nodes 22 in network 20 in determining how to handle faults when they occur, in accordance with a preferred embodiment of the present invention. For the purposes of this method, each node builds and maintains two masks—a general mask and a specific mask—preferably in an ordered bitmap form, with one bit for each of segments 31-37. At a general mask building step 50, the node builds a general mask indicating which of the segments cannot be reached as a result of the fault. In the situation shown in FIG. 3, the general mask constructed by node F would have the form 0000100, wherein the bits run in a counterclockwise direction from segment 31 (least significant bit) to segment 37 (most significant bit). The third bit is set to "1" to indicate that segment 33 is broken. Alternative orders and representations of the bits may also be used. The general mask in the absence of any fault in network 20 has the form 0000000.

The node builds a specific mask to represent each of its data flows, at a specific mask building step 52. In order to save time in implementing protection when a fault occurs, the specific mask for each data flow may be built at the time the data flow is initiated, rather than waiting for a fault to occur. For the flow shown in FIG. 1, the specific mask at node F has the form 0001111, to indicate that the flow passes through segments 31, 32, 33 and 34.

In order to determine how to handle the data flow following the fault, node F mathematically superimposes the applicable general and specific masks, preferably by taking the Boolean conjunction (AND) of the masks, at a conjunction step 54. If the conjunction is 0000000, the node can conclude that there is no overlap between this data flow and the failed segments in network 20, and therefore determines that no steering of this flow is required, at a non-action step 56. (As long as there is no fault in the network, the general mask itself is 0000000, so that the conjunction remains zero, and no steering is performed.)

In the situation shown in FIG. 3, however, the conjunction of the masks is 0000100, which is equal to the general mask itself. In this case, the node concludes that the current data flow overlaps all of the unreachable segments, and therefore steers the data flow around the ring in the opposite direction, at a steering step 58, as shown in the figure. On the other hand, if the conjunction is non-zero but is not equal to the general mask, the source node of the flow concludes that there are unreachable segments on both sides of the destination node, making the destination node itself unreachable. When this occurs, the source node preferably discards the packets in the data flow, at a discard step 60, in order to avoid wasting network bandwidth. Alternatively, the source node may hold the flow, and attempt to resend it later.

The following are some further examples of network faults and their handling with respect to the data flow of FIG. 1, using the method described above:

If node E fails, then the general mask is 0000011.
The conjunction of this mask with the specific mask 0001111 is 000011 (equal to the general mask), and the data flow is steered as in the case shown in FIG. 3.

If node A fails, the general mask is 0110000. The conjunction with the specific mask is 0000000, so that no steering is performed.

If segments 33 and 35 fail, the general mask is 0011100 (since segment 34 is also unreachable). The conjunction with the specific mask is 0001100, which is different from the general mask. In this case, the flow is discarded.

Although the preferred embodiment described above uses a certain type of bitmap representation of the ring network, along with the Boolean conjunction operator for superimposing the general and specific masks, it will be apparent to those skilled in the art that other mask representations and mathematical and/or logical operations may be used for the same purpose. Moreover, although this embodiment is described with reference to certain specific network configurations and communication protocols, the principles of the present invention may also be applied in ring networks of other types, which implement different protocols, such as SONET Bi-Directional Line-Switched Rings (BLSR). This protocol is described in Bellcore document GR-1230, entitled "SONET Bi-Directional Line-Switched Ring Equipment Generic Criteria," (December, 1998), which is incorporated herein by reference.

It will therefore be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. In a bidirectional ring network, in which nodes are mutually connected by network segments, a method of fault protection, comprising:

constructing a general mask indicating which of the segments are reachable in the event of a fault in the network by assigning a respective general mask bit to each segment, indicating whether the segment is reachable following occurrence of the fault;

for a given data flow to be conveyed through the network from a source node to a destination node, constructing a specific mask indicating the segments on a desired path of the flow by assigning a respective specific mask bit to each of the segments, indicating whether the flow was to be conveyed over the segment had occurrence of the segment been operational before the fault; and superimposing the general and specific masks in order to determine a disposition of the flow.

2. A method according to claim 1, wherein superimposing the masks comprises combining the masks by means of a Boolean operation.

3. A method according to claim 1, wherein superimposing the masks comprises determining whether to convey the data flow over the desired path, to steer the data flow over an alternative path, or to stop conveying the data flow.

4. A method according to claim 3, wherein superimposing the masks comprises generating a combined mask, and determining that the data flow should be conveyed over the desired path when the combined mask is null.

5. A method according to claim 3, wherein superimposing the masks comprises generating a combined mask, and determining that the data flow should be steered over the alternative path when the combined mask corresponds to the general mask.

6. A method according to claim 3, wherein superimposing the masks comprises generating a combined mask, and determining that the data flow should not be conveyed when the combined mask is neither null, nor does it correspond to the general mask.

7. A communication device for use in a bidirectional ring network, in which nodes are mutually connected by network segments, the device comprising a network processor, which is adapted to construct a general mask indicating which of the segments are reachable in the event of a fault in the network, the general mask comprising a respective general mask bit for each segment, indicating whether the segment is reachable following occurrence of the fault, and to construct a specific mask for a given data flow to be conveyed through the network from a source node to a destination node, the specific mask indicating the segments on a desired path of the flow by comprising a respective specific mask bit for each segment, indicating whether the flow was to be conveyed over the segment had occurrence of the segment been operational before the fault, and to superimpose the general and specific masks in order to determine a disposition of the flow.

8. A device according to claim 7, wherein the processor is adapted to superimpose the masks by performing a Boolean operation on the masks.

9. A device according to claim 7, wherein the processor is adapted to determine whether to convey the data flow over the desired path, to steer the data flow over an alternative path, or to stop conveying the data flow based on the superimposed masks.

10. A device according to claim 9, wherein the processor is adapted to superimpose the masks so as to generate a combined mask, and to determine that the data flow should be conveyed over the desired path when the combined mask is null.

11. A device according to claim 9, wherein the processor is adapted to superimpose the masks so as to generate a combined mask, and to determine that the data flow should be steered over the alternative path when the combined mask corresponds to the general mask.

12. A device according to claim 9, wherein the processor is adapted to superimpose the masks so as to generate a combined mask, and to determine that the data flow should not be conveyed when the combined mask is neither null, nor does it correspond to the general mask.

* * * * *